Aug. 6, 1935.　　　F. L. CUTLER　　　2,010,142
TRACTOR GUIDE
Filed Oct. 15, 1934　　　2 Sheets-Sheet 1
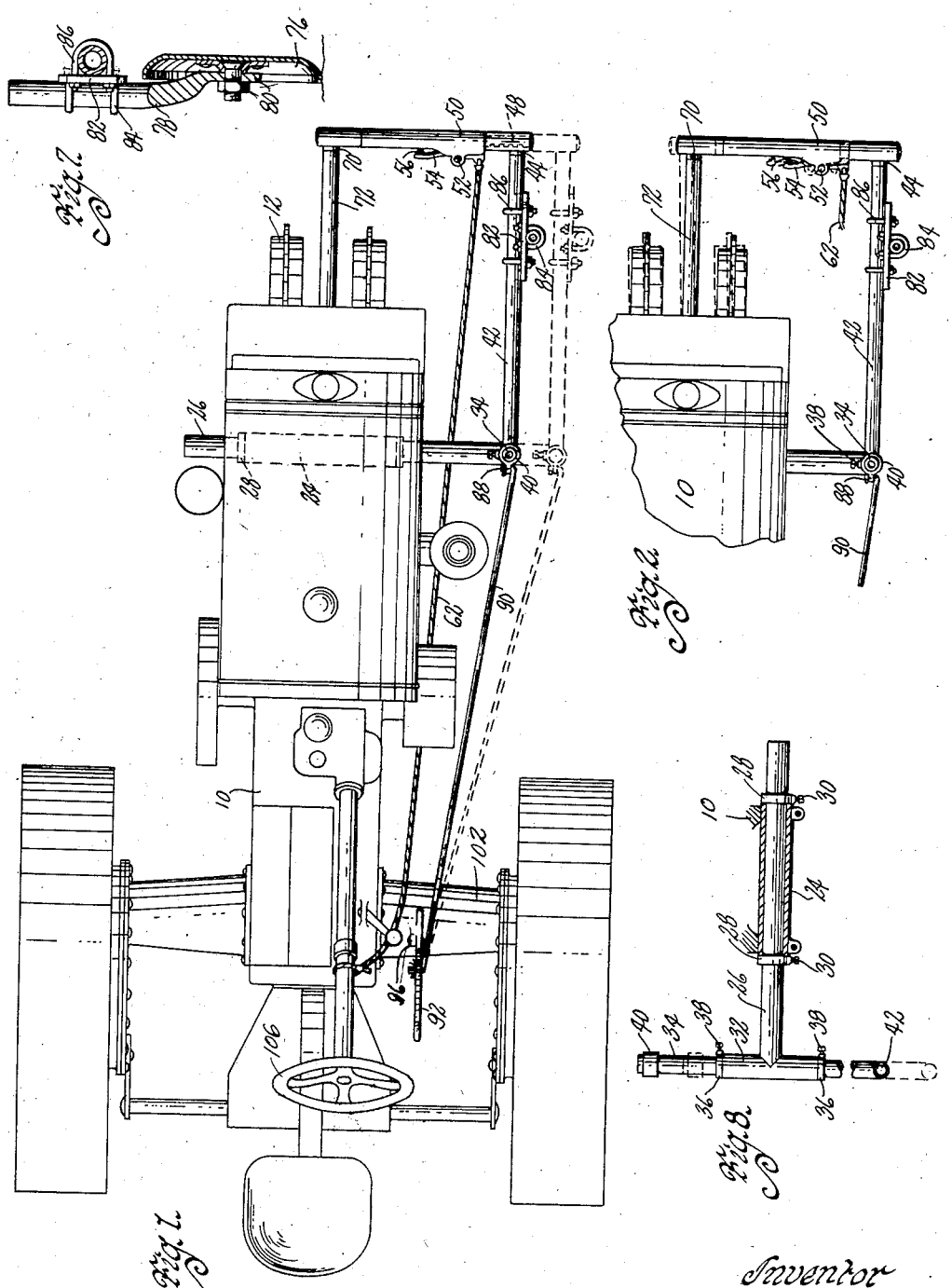

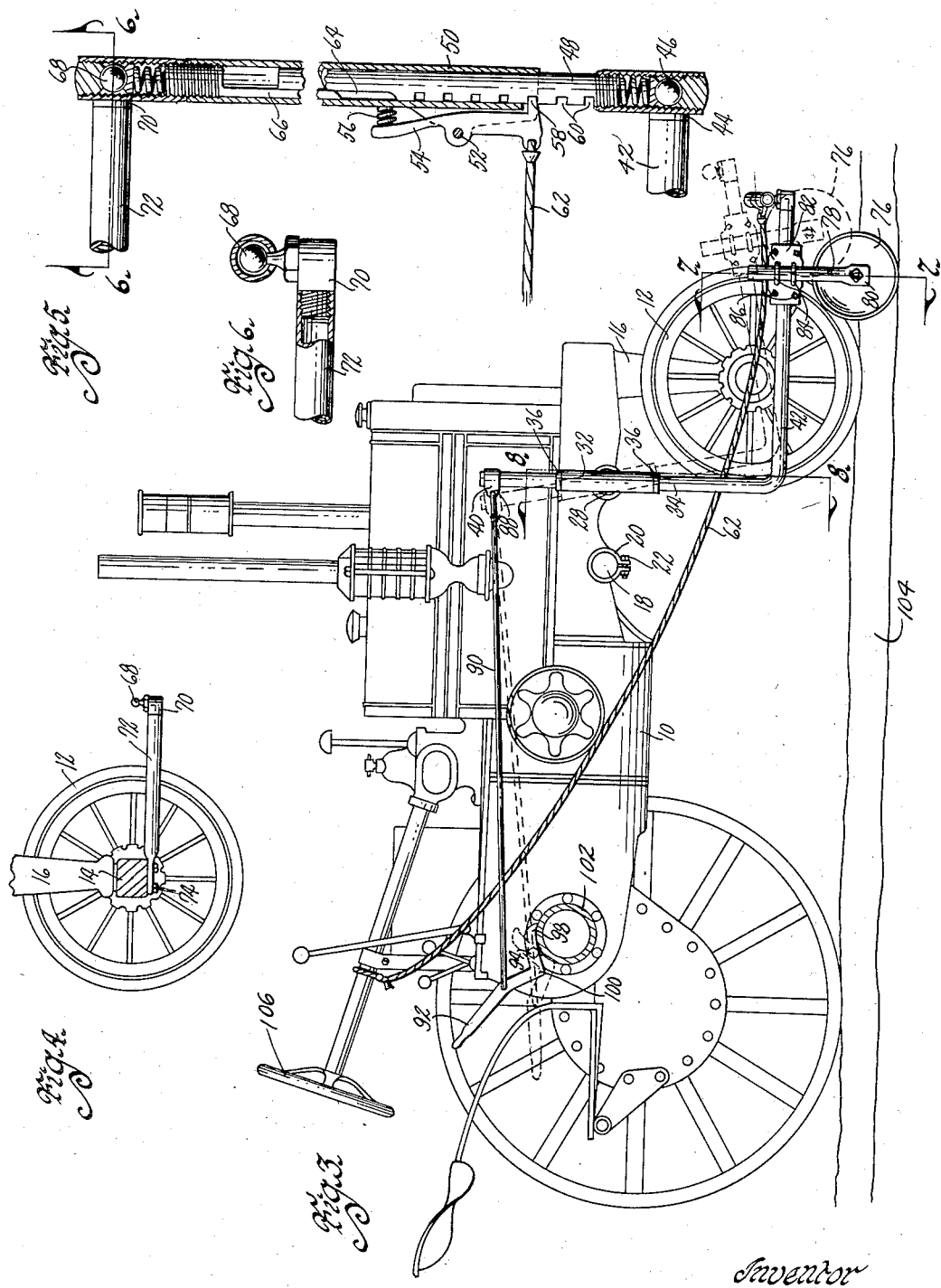

Patented Aug. 6, 1935

2,010,142

UNITED STATES PATENT OFFICE 2,010,142

TRACTOR GUIDE

Frank L. Cutler, Claremont, S. Dak.

Application October 15, 1934, Serial No. 748,379

15 Claims. (Cl. 97—49)

The object of my invention is to provide a tractor guide, which is simple, durable and comparatively inexpensive to manufacture.

A further object is to provide a guide readily attachable to a tractor, and having various quickly operable adjustments, whereby all parts of the guide can be adjusted to suit the work being done, the guiding element which travels in the furrow for guiding the tractor also being adjustable and being raisable out of the furrow, as when turning the tractor at the end of a row.

A further object is to provide a side hill adjustment means for the tractor guide, which is operable from the seat of the tractor for the purpose of causing the tractor to travel in the proper path on a side hill when using the guide.

Still a further object is to provide a tractor guide consisting of a rock shaft extending laterally from the tractor and having a T-shaped head with a guiding element projecting downwardly from the head, and a lever on the tractor adjacent the operator's seat for rocking the rock shaft and thereby raising the guiding element out of a furrow with which it coacts.

Another object is to provide a connection between the guiding element and the steerable wheels of the tractor, which is extensible and adjustable, the locking means for the adjustment being controllable from the seat of the tractor.

With these and other objects in view, my invention consists in the construction, arrangement and combination of the various parts of my tractor guide, whereby the objects contemplated are attained, as hereinafter more fully set forth, pointed out in my claims, and illustrated in the accompanying drawings, in which:

Figure 1 is a plan view of a tractor showing my tractor guide connected therewith.

Figure 2 is a similar view of the forward portion of Figure 1 showing the operation of a side hill adjustment.

Figure 3 is a side elevation of the tractor showing my tractor guide thereon.

Figure 4 is a vertical, sectional view between the steerable wheels of the tractor.

Figure 5 is an enlarged, sectional view of the connection between the guiding element and the steerable wheels of the tractor.

Figure 6 is a sectional view on the line 6—6 of Figure 5.

Figure 7 is a sectional view on the line 7—7 of Figure 3; and

Figure 8 is a sectional view on the line 8—8 of Figure 3.

In the accompanying drawings, the reference numeral 10 indicates generally a tractor. The steerable wheels thereof are indicated at 12, and they are mounted on an oscillatable axle 14, pivoted on a bracket 16 at the forward end of the tractor.

The tractor shown has a pair of perforations at 18 provided with rims 20, capable of being clamped together for reducing the diameter of the perforations 18, the means for clamping them together comprising bolts 22.

These perforations are provided on some makes of tractors for cultivators and other attachments, and I utilize one of them for supporting a sleeve 24 of my guide structure. Upon other types of tractors, of course, suitable brackets can be provided for the sleeve 24.

A rock shaft 26 is mounted in the sleeve 24, which is longitudinally adjustable through the sleeve and is retained in position by collars 28 and set screws 30. A T-shaped head 32 is provided on the outer end of the rock shaft 26. A vertical rod 34 extends slidably through the head 32 and is retained in any desired position by collars 36 and set screws 38. A head 40 is secured to the upper end of the rod 34. The lower end of the rod 34 terminates in a forward extension 42 having a plug 44, similar to the plug 70 of Figure 6, screwed therein, and a ball head 46 extending upwardly from the plug 44.

A link consisting of a rod 48 and a tube 50 has its rod end swivelly associated with the ball head 46. The tube 50 has a pivot pin 52 supported by ears extending therefrom, and a detent lever 54 is pivoted thereon and urged in one direction by a spring 56. The detent lever 54 has a finger 58 selectively engageable with notches 60 in the rod 48 and a flexible element, such as a rope 62, is connected with the detent lever for retracting the finger from any notch with which it engages.

To prevent rotation of the rod 48 relative to the tube 50, I flatten the rod as indicated at 64, and provide a similar cylindrical key 66 mounted in the tube to coact therewith.

The tube end of the connecting link, consisting of the elements 48 and 50, is swivelly associated with a ball head 68 mounted on the plug 70. The plug 70 is screwed into the forward end of a steering lever 72, which in turn has its rearward end secured as by bolts 74 to the steerable axle 14.

A guide element comprising a disc 76 is mounted on a shank 78. A journal bolt or the like 80 connects the disc 76 with the shank 78. The shank 78 connects with a plate 82 and is held in clamping relation relative thereto by U-bolts 84. The plate 82 is in turn clamped to the extension 42 of the rod 34 by U-bolts 86.

Means is provided for rocking the rock shaft 26 from the driver's seat, consisting of an ear 88 on the head 40 and a link 90 connecting this ear with a lever 92. The lever 92 is pivoted to a bolt 94 on the tractor, which is supported by an ear or the like 96 thereon. The lever 92 has ends 98 and 100 for selectively contacting with a shaft housing 102 in the lowered and raised positions of the guide element 76, as shown by solid and dotted lines respectively in Figure 3.

*Practical operation*

In the operation of my device, the guide element 76 when lowered into a furrow 104 will follow the furrow, so that when the furrow bends toward the right or the tractor tends to pivot toward the left, the guide element will swing relative to the tractor toward the right, and thus turn the wheels 12 in that direction, thus keeping the tractor in a path in alignment with the furrow. Likewise the guide element 76 will swing the wheels 12 toward the left.

At the end of the furrow when it is desired to turn the tractor around or in case the guide is not to be used, the lever 92 can be pulled rearwardly for lifting the guide from the furrow, so that it has no guiding action, and the tractor can be guided manually by the steering wheel 106.

Referring to Figure 2, when the tractor is being operated on a slight hill sloping to the right, it is desirable to pivot the wheels slightly toward the left to counteract the tendency of the tractor to drift sidewise down the hill. This is accomplished by retracting the finger 58 by pulling on the rope 62, and then manually steering the wheels 12 toward the left until the desired notch 60 is in alignment with the finger 58, whereupon the finger will drop into the notch. Where the side hill is steeper, the number of notches off-center, of course, should be increased.

My particular construction is universally adjustable for all types of tractors and conditions encountered under which a tractor is to be guided.

The rock shaft 26 can be adjusted as indicated by dotted lines in Figure 1, the detent lever 54 permitting the extension of the connecting link between the arms 42 and 72 to accommodate the new position of the T-shaped head 32.

The arm 42 can be adjusted any height relative to the ground by manipulating the collars 36 and the set screws 38, while up and down or forward and rearward adjustment of the disc 76 is possible relative to the arm 42. Forward and rearward adjustment of the disc will increase or decrease the leverage of the disc 76 on the arm 72 and likewise decrease or increase the motion of the arm 72 relative to the arm 42.

It is therefore obvious that my particular construction enables adjustment of the guide to accommodate any desired installation and at the same time a simple arrangement of but few parts is provided.

Some changes may be made in the construction and arrangement of the various parts of my tractor guide without departing from the real spirit and purpose of my invention, and it is my intention to cover by my claims, any modified forms of structure or use of mechanical equivalents which may be reasonably included within their scope.

I claim as my invention:

1. In a tractor guide, a sleeve mounted transversely on a tractor, a rock shaft therein, and adjustable longitudinally thereof, a T-shaped vertically arranged head on said rock shaft, a rod adjustable longitudinally relative thereto and supported thereby, a forward extension on the lower end of said rod, a lever pivoted to said tractor, an operative connection between said lever and said rock shaft for tipping the rock shaft, a plate longitudinally adjustably mounted on said extension, a vertical shank carried thereby and adjustable vertically relative thereto, a steering element on said shank adapted to travel in a furrow, a steering lever connected with the steerable wheels of said tractor, and a link connecting said lever and said extension, said link comprising a rod and a tube telescopically associated with each other, a detent carried by said tube, said rod having notches to selectively coact therewith, and means extending to adjacent the driver's seat of said tractor to retract said detent.

2. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate mounted on said extension, a vertical shank carried thereby, a steering element on said shank adapted to travel in a furrow, a steering lever connected with the steerable wheels of said tractor, and a link connecting said lever and said extension, said link comprising a rod and a tube telescopically associated with each other, a detent carried by said tube, said rod having notches to selectively coact therewith, and means extending to adjacent the driver's seat of said tractor to retract said detent.

3. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate mounted on said extension, a vertical shank carried thereby, a steering element on said shank adapted to travel in a furrow, a steering lever connected with the steerable wheels of said tractor, and a link connecting said lever and said extension.

4. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate mounted on said extension, a vertical shank carried thereby, a steering element on said shank adapted to travel in a furrow, a steering lever connected with the steerable wheels of said tractor, a link connecting said lever and said extension, said link comprising a rod and a tube telescopically associated, and means for locking and unlocking said rod relative to said tube when desired.

5. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate mounted on said extension, a vertical shank carried thereby, a steering element on said shank adapted to travel in a furrow, a steering lever connected with the steerable wheels of said tractor, a link connecting said lever and said extension, said link comprising a rod and a tube telescopically associated, and means for locking and unlocking said rod relative to said tube when desired, said means being remotely controllable.

6. In a tractor guide, a sleeve mounted transversely on a tractor, a rock shaft therein and adjustable longitudinally thereof, a T-shaped vertically arranged head on said rock shaft, a rod supported thereby, a forward extension on the lower end of said rod, a lever pivoted to said tractor, an operative connection between said lever and said rock shaft for tipping the rock shaft, a plate mounted on said extension, a vertical shank carried thereby, a steering element on said shank adapted to travel in a furrow, a steering lever connected with the steerable wheels of said tractor, and a link connecting said lever and said extension.

7. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate longitudinally adjustably mounted on said extension, a vertical shank carried thereby and adjustable vertically relative thereto, a steering element on said shank adapted to travel in a furrow, a steering lever connected with the steerable wheels of said tractor, and a link connecting said lever and said extension.

8. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate longitudinally adjustably mounted on said extension, a vertical shank carried thereby, a steering element on said shank adapted to travel in a furrow, a steering lever connected with the steerable wheels of said tractor, and a link connecting said lever and said extension.

9. In a tractor guide, a sleeve mounted transversely on a tractor, a rock shaft therein, a T-shaped vertically arranged head on said rock shaft, a rod supported thereby, a forward extension on the lower end of said rod, a lever pivoted to said tractor, an operative connection between said lever and said rock shaft for tipping the rock shaft, a plate longitudinally adjustably mounted on said extension, a vertical shank carried thereby, a steering element on said shank adapted to travel in a furrow, a steering lever connected with the steerable wheels of said tractor, and a link connecting said lever and said extension.

10. In a tractor guide, a sleeve mounted transversely on a tractor, a shaft therein, a head on said shaft, a substantially vertical rod supported thereby, a forward extension on the lower end of said rod, a plate longitudinally adjustably mounted on said extension, a vertical shank carried thereby, a steering element on said shank adapted to travel in a furrow, a steering lever connected with the steerable wheels of said tractor, and a link connecting said lever and said extension.

11. In a tractor guide, a sleeve mounted transversely on a tractor, a shaft therein, a head on said shaft, a rod supported thereby, a forward extension on said rod, a plate longitudinally adjustably mounted on said extension, a vertical shank carried thereby, a steering element on said shank adapted to travel in a furrow, a steering lever connected with the steerable wheels of said tractor, a link connecting said lever and said extension, said link comprising a rod and a tube telescopically associated, and means for locking and unlocking said rod relative to said tube when desired.

12. In a tractor guide, a shaft rockably mounted to extend transversely from a tractor, an extension pivoted thereto on a vertical axis, a guide element adapted to travel in a furrow, said guide element being carried by and adjustable longitudinally of said extension, and an operative connection between said extension and the steerable wheels of said tractor to steer said wheels in accordance with the travel of said guide in a furrow.

13. In a tractor guide, a shaft rockably mounted to extend transversely from a tractor, an extension pivoted thereto on a vertical axis, a guide element adapted to travel in a furrow, said guide element being carried by and adjustable vertically relative to said extension, and an operative connection between said extension and the steerable wheels of said tractor to steer said wheels in accordance with the travel of said guide in a furrow.

14. In a tractor guide, a sleeve mounted transversely on a tractor, a shaft therein, a head on said shaft, a rod supported thereby, a forward extension on said rod, a plate mounted on said extension, a vertical shank carried thereby, a steering element on said shank adapted to travel in a furrow, a steering lever connected with the steerable wheels of said tractor, and a link connecting said lever and said extension.

15. In a tractor guide, a sleeve mounted transversely on a tractor, a shaft therein, a head on said shaft, a rod supported thereby, a forward extension on said rod, a plate mounted on said extension, a vertical shank carried thereby, a steering element on said shank adapted to travel in a furrow, a steering lever connected with the steerable wheels of said tractor, and a link connecting said lever and said extension, said link having ball and socket connections with said lever and extension.

FRANK L. CUTLER.